United States Patent [19]

Frode et al.

[11] 4,200,687
[45] Apr. 29, 1980

[54] SEPARATOR

[75] Inventors: Per E. L. Frode; Karl B. R. Olsson, both of Oskarshamn, Sweden

[73] Assignee: Nife Jungner AB, Oskarshamn, Sweden

[21] Appl. No.: 29,365

[22] Filed: Apr. 12, 1979

[30] Foreign Application Priority Data

Apr. 28, 1978 [SE] Sweden .............................. 7804906

[51] Int. Cl.$^2$ ............................................ H01M 2/18
[52] U.S. Cl. ................................... 429/130; 429/138; 429/142
[58] Field of Search ............... 429/130, 131, 129, 133, 429/136, 138, 142, 208

[56] References Cited

U.S. PATENT DOCUMENTS

| 852,569 | 5/1907 | Lyndon | 429/138 |
|---|---|---|---|
| 1,247,123 | 11/1917 | Luthy | 429/138 |
| 1,447,783 | 3/1923 | Holland et al. | 429/136 |
| 1,668,404 | 5/1928 | Hollen | 429/136 X |
| 3,201,280 | 8/1965 | Yumoto | 429/131 X |

*Primary Examiner*—Anthony Skapars
*Attorney, Agent, or Firm*—Burns, Doane, Swecker & Mathis

[57] ABSTRACT

A separator is disclosed for a flat, substantially vertical electrode plate in an electric accumulator. An electrode array is also disclosed which consists of alternatingly placed positive and negative, flat, substantially vertically arranged electrode plates, and said separators. The separator is of the type which comprises two substantially vertical, U-shaped edge insulating members. According to the invention these are kept together by a bottom strip and two parallel top strips, all strips being substantially horizontal, and at least one vertical insulating rod between each top strip and the bottom strip, a space for the electrode plate being formed within said separator.

9 Claims, 7 Drawing Figures

SEPARATOR

The present invention relates to a separator for a flat, substantially vertical electrode plate in an electric accumulator. It also relates to an electrode array consisting of alternatingly placed positive and negative, flat, substantially vertically arranged electrode plates, and such separators.

Especially in alkaline accumulators with flat electrodes, it has long been the practice to use a plurality of loose insulating rods as separating means between electrode plates of different polarities, said rods being placed in vertical grooves in the side surfaces of the plates. The insulating rods have not been inserted in their grooves until after the electrode plates have been stacked and made into an electrode array with alternating positive and negative electrodes. This is a manual process, demanding in both time and cost.

Instead of using loose insulating rods, attempts have been made to use frames with rods attached thereto, for placing such an insulating frame between each plate when stacking the plates to form an electrode array. This method will also be time-consuming, and the insulating frames will be expensive and comparatively heavy.

Plate insulators in the form of a kind of bag or sack, which is pulled over the electrode, have been used, but these are not suitable for alkaline accumulators since they constitute a too great obstacle for the electrolyte circulation within the accumulator.

Net-like flexible casings of insulating material around each electrode of the same polarity in an electrode array have also been proposed. The casing consists of two groups of rods crossing each other, one group having vertical rods, kept together by the rods of the other group, placed at an angle to the first ones. However, due to the large number of inclined rods, these insulating casings contain an unnecessary amount of material. Neither do they permit the sludge, which possibly comes from the electrode plates, to fall freely, not even if the inclined rods have smaller thickness than the vertical ones, and collections of sludge can occur at the intersections of the rods.

The object of the present invention is to provide a separator means which is cheap in manufacture, has the lowest possible weight, gives free circulation of the electrolyte around the electrode plates, stays well fixed to the plates, gives free discharge of the gases which can occur during operation of an accumulator, gives a free fall for possible sludge from the plates without risk of forming sludge bridges, and which is easy to fit.

A suitable such separator is manufactured from electrically insulating materials, and comprises two substantially vertical, U-shaped edge insulating members or bars. In accordance with the invention, these are kept together by a substantially horizontal bottom strip in the lower portions of the edge insulating members, and by two parallel, substantially horizontal top strips in the upper portions of the edge insulating members, parallel to said edge insulating members there being at least one insulating rod between each top strip and bottom strip. A space for a flat, substantially vertical electrode plate is thus formed between the edge insulating members, the bottom strip, the top strips and the insulating rods.

The bottom strip is preferably placed centrally under the space for the electrode plate, and its thickness should be less than said space taken up by the electrode plate thickness. Thus, sludge possibly falling down from the electrode plate can not fasten and cause current bridges between the electrodes.

The thicknesses of the two top strips are advantageously less than the thicknesses of the insulating rods, thus providing free discharge for the gases which can occur during operation of an accumulator, especially during charging of the same.

The insulating rods on either side of the space for the electrode plate can either be placed directly opposite to each other in pairs, or displaced laterally in relation to each other. In the first case, there is obtained the greatest safety against short-circuiting in an accumulator, if the positive plates swell after they have been taken into use, which is often the case. In the second case, the advantage is gained that no part of the plates is risked being completely blocked by the insulating rods, since the electrolyte is always given full access to the plate from one side or the other, independent of the rods.

Further security against the insulating rods lying against the electrode plate and partly covering the same is obtained if the legs or arms of the U-shaped edge insulating members are provided with projections on the outsides thereof, these projections determining the distance to a parallel, adjacent electrode plate when assembling an electric accumulator. The insulating rods then do not serve as spacer means, but only as protection against short-circuiting if the positive plates were to swell.

A separator in accordance with the invention can preferably be injection moulded from a plastic in an integral unit. In this connection, the insulating rods can suitably have a cross section in the form of a trapezoid with the base facing the space for the electrode plate. During after-shrinkage of the plastic, the rods in the separator move away from each other, starting from the middle, so that the separator can be more easily pulled from the mould core after moulding. In this way, the separator will also be easier to pull over the electrode plate when assembling an electrode array into an accumulator.

The electrode array consists of alternatingly arranged positive and negative, substantially vertical electrode plates, the array being kept together by a horizontal band round the electrode array. A separator in accordance with the previous description is placed round every second electrode plates in the electrode array.

Fitting the separator is extremely simple, since a separator is pulled over each electrode plate of the same polarity from the bottom of the plate until the bottom strip of the separator stops against the bottom edge of the plate. When the whole electrode array is insulated in this way, the separators are fixed by drawing the band tight around the array. The material of the separator is suitably a plastics material, such as propylene, ethylene, or acetate plastics. These materials float in the electrolyte normally used in an alkaline accumulator, but even if one of the separators were not to be properly retained by the band, it will not float up, since it is stopped by the bottom strip of the separator which engages against the bottom edge of the electrode plate.

The invention will now be described in more detail while referring to the accompanying drawing illustrating embodiments of the invention by way of example. In the drawing.

Figure 1:
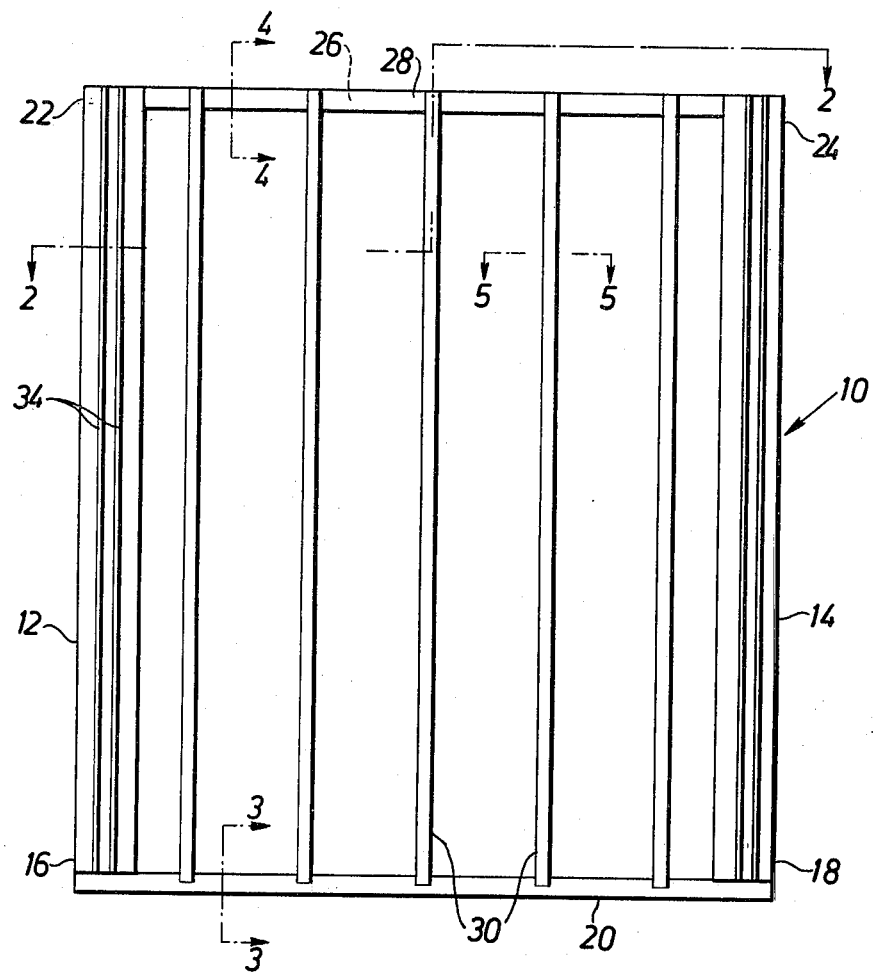
FIG. 1 shows a side view of a separator in accordance with the invention.

In the drawing the numeral 10 denotes a separator in accordance with the invention. The separator has two substantially vertically arranged U-shaped edge insulating strips 12, 14 intended to enclose the vertical side edges of a flat, substantially vertical electrode plate. These edge insulating strips 12, 14 are kept together at their bottom portions 16, 18 by a substantially horizontal bottom strip 20 and in their top portions 22, 24 by two substantially horizontal top strips 26, 28. Parallel to the edge insulating strips 12, 14 there are several insulating rods 30, joining the bottom strip 20 with the top strips 26 and 28, respectively. In this way there is formed a space for a flat, substantially vertical electrode plate between the edge insulating strips 12, 14, the bottom strip 20, the top strips 26, 28 and the insulating rods 30. The number of insulating rods 30 can be varied and suited to each case, with respect to the size of the accumulator in which the separator is to be used.

Figure 3:
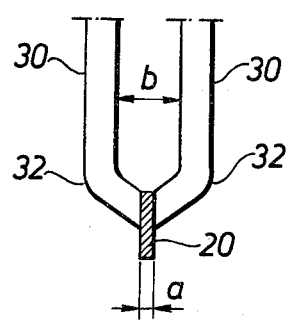
FIG. 3 shows an enlarged section along the line 3—3 in FIGS. 1 and 2.

The bottom strip 20 is preferably placed centrally below the space for the electrode plate. It is apparent from FIG. 3 that the thickness a of the bottom strip 20 is less than the dimension b denoting the thickness of the electrode plate. To provide for this difference, the insulating rods 30 are preferably turned in towards the bottom strip 20, close to the place where each rod joins the strip as is shown at 32 in the drawing.

Figure 4:
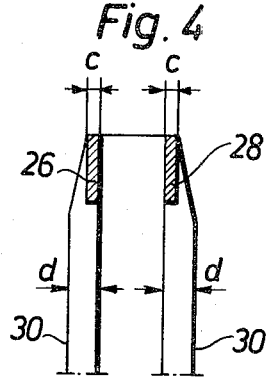
FIG. 4 shows an enlarged section along the line 4—4 in FIG. 1.

The thickness c of the two top strips 26, 28 in FIG. 4 is preferably less than the thickness d of the insulating rods 30.

Figure 5:
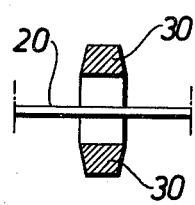
FIG. 5 shows an enlarged section along the line 5—5 in FIG. 1.
Figure 6:
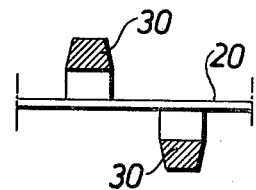
FIG. 6 shows an alternative embodiment of the details in the section according to FIG. 5.

In FIG. 5 the insulating rods 30 are placed in pairs exactly opposite to each other on either side of the space for the electrode plate. FIG. 6 shows an alternative embodiment where the insulating rods 30 on one side of the space are laterally displaced in relation to those on the other side.

Figure 2:
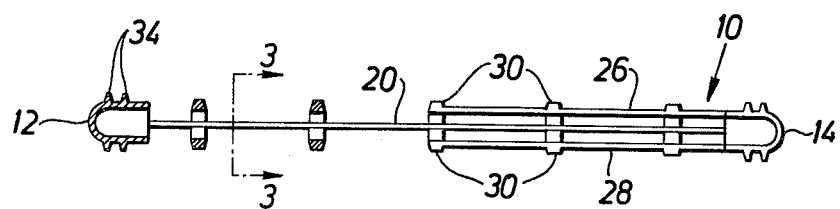
FIG. 2 shows the same separator seen from above and partly sectioned along the line 2—2 in FIG. 1.

Preferably, the legs of the U-shaped edge insulating strips 12, 14 are provided with one or more projections, which are illustrated as ridges 34 in FIGS. 1 and 2. Instead of being formed as ridges, these projections can be formed as more or less regularly placed nodules or the like. As is apparent from the drawing, the projections 34 are preferably pointed. The material of the separator is then suitably of a type which can yield to some extent to the application of pressure, so that the tips of the projections can be deformed to a certain extent.

If the separator is made by injection moulding in one integral part, which is a suitable method of manufacture, it is to advantage if the insulating rods 30 have a cross section in the form of a trapezoid, which is shown most clearly in FIGS. 5 and 6. Then it turns out that the rods in their longitudinal directions are given a weak curvature from the middle of the separator. This will make it easier to pull the separator away from the core in the mould, which is necessary for manufacturing the separator in one single piece.

Figure 7:
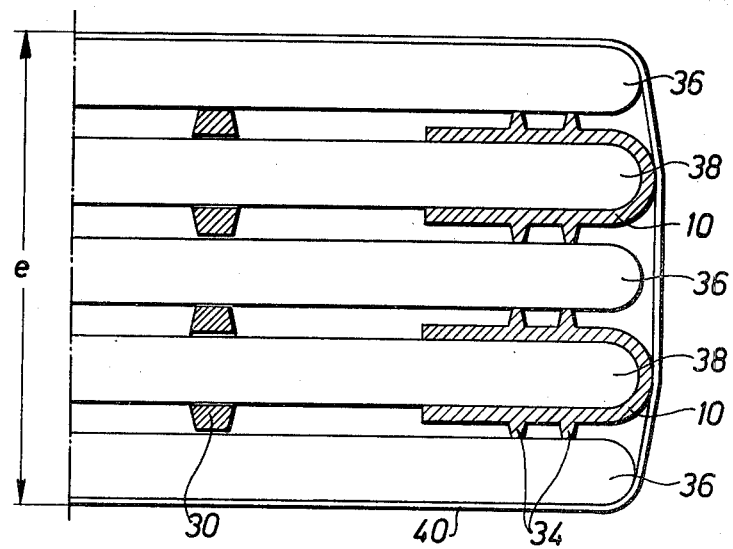
FIG. 7 is a section of an example of a portion of an electrode array in accordance with the invention.

Separators in accordance with the invention are intended for use as insulation in electrode arrays for electric accumulators. A cross section of a portion of such an electrode array is shown in FIG. 7. In said figure negative electrode plates are denoted by the numeral 36. Positive electrode plates 38 are placed between these. A separator 10 in accordance with the invention is placed over each positive electrode plate, the array being kept together by a metal or plastics band 40. When the electrode array is fixed together, the band 40 is tensioned so much that the right dimension e is obtained for the array. The pointed projections 34 thus yield so that any tolerance differences in the electrode plates and separators are compensated for. On the other hand, the insulating rods 30 will be free and do not press against the electrode plates, instead leaving room for electrolyte circulation between the plates. However, the insulating rods provide for secure protection against short-circuiting between the plates, if said plates should possibly swell.

What is claimed is:

1. In a separator for a flat, substantially vertical electrode plate in an electric accumulator, manufactured from electrically insulating material and comprising two vertical, U-shaped edge insulating members, the improvement which comprises that the edge insulating members are kept together by a substantially horizontal bottom strip in the bottom portions of said members, and by two parallel, substantially horizontal top strips in the top portions of said members, and at least one insulating rod parallel to the edge insulating members, between each top strip and the bottom strip, so as to form a space for the electrode plate between the edge insulation members, the bottom strip, the top strips and the insulating rods.

2. A separator as claimed in claim 1, wherein the bottom strip is placed centrally below the space for the electrode plate, and that its thickness is less than the width of said space.

3. A separator as claimed in claim 1, wherein the thickness of the top strips is less than the thickness of the insulating rods.

4. A separator as claimed in claim 1, wherein the insulating rods on either side of the space for the electrode plate are placed in pairs directly opposite to each other.

5. A separator as claimed in claim 1, wherein the insulating rods on either side of the space for the electrode plate are laterally displaced in relation to each other.

6. A separator as claimed in claim 1, wherein the legs of the U-shaped edge insulating members are provided on their outsides with projections determining the distance to a parallel adjacent electrode plate when assembled into an electric accumulator.

7. A separator as claimed in claim 1, wherein the separator is injection moulded from a plastics material in one integral part.

8. A separator as claimed in claim 7, wherein the insulating rods have a cross section in the shape of a trapezoid with its base facing towards the space for the electrode plate.

9. An electrode array consisting of alternately placed positive and negative, flat, substantially vertical electrode plates, kept together by a horizontal band round the array, wherein a separator in accordance with claim 1 is placed over every second electrode plates in the electrode array.

* * * * *